C. O. JOHNSON.
BEARING.
APPLICATION FILED APR. 17, 1911.

1,050,140. Patented Jan. 14, 1913.

Witnesses
Chas. W. Stauffiger
Anna C. Paviter

Inventor
Charles O. Johnson
By Bartho  
Attorneys.

UNITED STATES PATENT OFFICE.

CHARLES O. JOHNSON, OF DETROIT, MICHIGAN.

BEARING.

1,050,140.  Specification of Letters Patent.  Patented Jan. 14, 1913.

Application filed April 17, 1911. Serial No. 621,462.

*To all whom it may concern:*

Be it known that I, CHARLES O. JOHNSON, a citizen of the United States of America, residing at Detroit, in the county of Wayne and State of Michigan, have invented certain new and useful Improvements in Bearings, of which the following is a specification, reference being had therein to the accompanying drawings.

This invention relates to anti-friction bearings, and more particularly to an arrangement thereof, whereby the end thrust friction is eliminated to a large extent and whereby means are provided for preventing displacement of the parts which are otherwise so disposed as to present only rolling contact between opposed bearing surfaces both for end and radial thrusts.

The invention consists in the matters hereinafter set forth, and more particularly pointed out in the appended claims.

Figure 1:
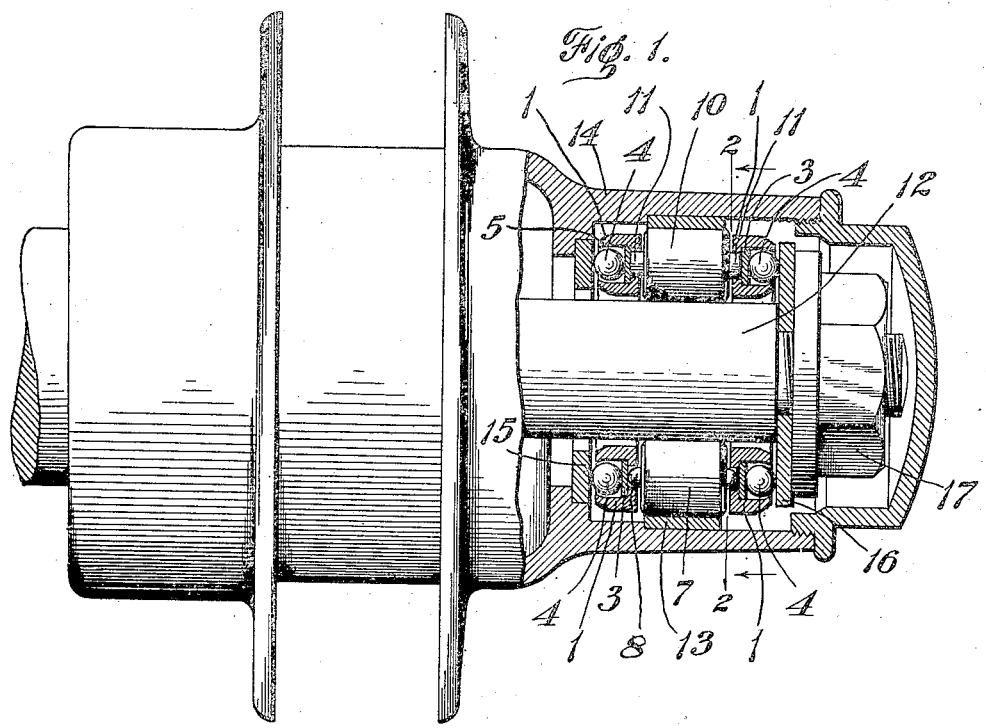
Figure 2:
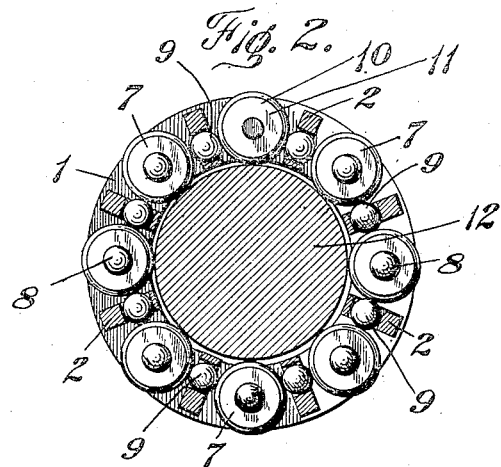

In the drawings, Figure 1, is a view partially in elevation and partially in longitudinal section of a bearing that embodies features of the invention mounted in operative position in the hub of a wheel and on a journal; and Fig. 2, is a view in transverse section on or about line 2—2 of Fig. 1.

As herein shown in preferred form, a cage is formed of a pair of end rings or members 1, held in parallel spaced relation by tie bars 2, whose reduced end portions pass through and are headed down or otherwise secured to the members 1. The outer faces of the members are each provided with an annular groove or race-way concentric with the member in which a lining ring 3 is inserted to cover the ends of the tie bars 2, and form a race-way for end thrust balls 4, the walls of each side of the groove having their outer margins slightly inset, as indicated at 5, to retain the balls.

A series of rolls 7 of proper dimensions to rotate freely between the tie bars 2, with their peripheries extending within and without the inner and outer peripheries respectively of the members 1, are disposed in regular alternation with the bars 2, and are suspended in place by inner balls 8, engaging axial sockets in the ends of the rolls and openings through the inner faces of the members 1, the balls riding on the inner faces of the lining rings 3. Intermediate spacing balls 9, in openings in the tie bars 2, contact with the peripheries of each adjacent pair of rolls and are preferably disposed so that their centers lie in a circle of less diameter than the circle in which the centers of the end walls 7 are arranged. As a further detail of construction the balls 9 may be placed in line with the axes of the adjacent pairs of rolls, so that thrust of one roll to the next is communicated in a straight line through these balls.

The set of rolls 7 with their intermediate balls 9 may creep around so that the rolls come into contact with the tie bars 2 of the cage. To avoid this, one or more of the rolls as indicated at 10, have cylindrical journals or pintles 11, that replace the balls 8, and engage apertures or openings on the inner faces of the members 1, centrally between the adjacent pair of bars 2. The journaled roll or rolls act as driving means to hold the train of rolls, and the intermediate balls against circumferential displacement when the bearing is placed on a journal 12, with a surrounding bearing ring 13, in a hub or sleeve 14. This avoids any creeping and effectively prevents contact, except at the drive roll pintles, of surfaces which are not in rolling engagement.

When assembled as shown, the balls 4, are arranged to abut or roll on end thrust rings 15 and 16, the inner one of which is mounted in the sleeve or hub 14, and the outer one of which is held on the end of the journal 12, by the usual bur or nut 17.

By this arrangement an anti-friction bearing is obtained which presents only rolling members between opposed bearing surfaces for taking up their radial or end thrust, and which also effectively holds all the rolling members in such spaced relation that they do not tend to become damaged or moved into contact with the spacing or stationary members of the cage.

Obviously, changes in the details of construction may be made without departing from the spirit of the invention, and I do not care to limit myself to any particular form or arrangement of parts.

What I claim is:

1. A bearing comprising a cage consisting of a pair of end rings held in parallel spaced relation by regularly disposed tie bars secured at their ends to the rings, end thrust balls traveling in annular race-ways in the outer faces of the rings, a series of rolls between the spacing bars and rings, end thrust balls engaging axial sockets in the roll ends and openings in the inner faces of the rings, and intermediate balls in openings through the tie bars in rolling contact with the adjacent rolls, one or more of the rolls having end pintles replacing the end thrust balls and engaging the ring openings.

2. A bearing comprising a cage consisting of end rings each having an annular raceway in its outer face and openings through its inner face into the groove of the raceway, tie bars having reduced ends extending through ring openings in which they are secured, and a lining ring in the bottom of each race-way, end thrust balls in the raceways, rolls alternating with the tie bars, end thrust balls engaging axial sockets in the roll ends and bearing against the lining rings through openings in the inner faces of the end rings, and intermediate balls in openings in the tie bars in rolling contact with the adjacent rolls, one or more of the rolls having end pintles replacing the end thrust balls and journaled in openings in the rings.

3. A bearing comprising a cage consisting of end rings provided with outer annular race-ways and inner bearing openings at regular intervals, tie bars alternating with the inner openings and securing the rings in spaced relation, one or more driving rolls having end pintles journaled between the rings, said pintles engaging bearing openings in the rings, rolls in the remaining spaces between the tie bars having axial sockets, end thrust balls engaging said sockets and the openings in the rings, and intermediate spacing balls in openings in the tie bars in rolling contact with adjacent rolls.

4. A bearing comprising a cage consisting of end rings, tie bars secured at their ends to the rings in regular spaced relation, lining rings each seated in an annular groove in the outer end face of each ring over bearing openings through the inner face of the ring, end thrust balls retained in the grooves by the inbent outer margins thereof, one or more driving rolls having end pintles journaled in the bearing openings in the rings between the tie bars, rolls in the other intervals between the tie bars, end thrust balls engaging axial sockets in the ends of the latter rolls and the inner bearing openings of the rings and intermediate balls in openings in the tie bars in rolling contact with the adjacent rolls.

5. A bearing comprising a pair of end rings each having an annular raceway in its outer face, bearing openings through its inner face into the groove of the raceway, at regular intervals, and tie-bar openings alternating within the bearing openings, flattened tie-bars having reduced end portions secured in the tie-bar openings for holding the rings in parallel spaced relation and provided with transverse apertures for spacing balls disposed in circles of less diameter than the circles in which the ring bearing openings are disposed, a lining ring in the bottom of each raceway, end-thrust balls in the raceway, a series of rolls alternating with the spacing bars, end pintles on one or more of the rolls engaging adjacent bearing openings in the rings, end thrust balls engaging axial end sockets in the rest of the rolls and lying in the ring bearing openings against the lining rings and spacing balls in the transverse apertures of the bars in rolling contact with the adjacent rolls.

In testimony whereof I affix my signature in presence of two witnesses.

CHARLES O. JOHNSON.

Witnesses:
LEWIS E. FLANDERS,
ANNA C. RAVILER.

Copies of this patent may be obtained for five cents each, by addressing the "Commissioner of Patents, Washington, D. C."